(12) United States Patent
McCammon et al.

(10) Patent No.: US 7,630,968 B2
(45) Date of Patent: Dec. 8, 2009

(54) EXTRACTING INFORMATION FROM FORMATTED SOURCES

(75) Inventors: Keiron McCammon, Danville, CA (US); Manish Chandra, Fremont, CA (US)

(73) Assignee: Kaboodle, Inc., Sunnyvale, CA (US)

(*) Notice: Subject to any disclaimer, the term of this patent is extended or adjusted under 35 U.S.C. 154(b) by 307 days.

(21) Appl. No.: 11/357,656

(22) Filed: Feb. 16, 2006

(65) Prior Publication Data
US 2006/0200457 A1    Sep. 7, 2006

Related U.S. Application Data

(60) Provisional application No. 60/656,040, filed on Feb. 24, 2005.

(51) Int. Cl.
*G06F 17/30* (2006.01)
(52) U.S. Cl. ............... 707/3; 707/2; 707/7; 715/200
(58) Field of Classification Search ............... None
See application file for complete search history.

(56) References Cited

U.S. PATENT DOCUMENTS

| | | | |
|---|---|---|---|
| 6,606,659 B1* | 8/2003 | Hegli et al. | 709/225 |
| 6,947,985 B2* | 9/2005 | Hegli et al. | 709/224 |
| 2002/0091671 A1* | 7/2002 | Prokoph | 707/1 |
| 2004/0158799 A1* | 8/2004 | Breuel | 715/513 |
| 2005/0131896 A1* | 6/2005 | Cao et al. | 707/6 |
| 2005/0289452 A1* | 12/2005 | Kashi et al. | 715/512 |
| 2006/0224950 A1* | 10/2006 | Takaai et al. | 715/512 |

* cited by examiner

*Primary Examiner*—Pierre M Vital
*Assistant Examiner*—Loan T Nguyen
(74) *Attorney, Agent, or Firm*—Brill Law Office

(57) ABSTRACT

An extraction manager extracts information from formatted input. The input is annotated with presentation information, and parsed into a set of elements comprising a canonical representation thereof. An information analyzer analyzes the elements in order to glean additional information. An entity extractor determines entities to extract from the input. The entity extractor analyzes elements according to specific entities to be extracted, and creates entity specific observations for analyzed elements. These observations comprise possible values for the relevant entities. A heuristics processor maintains a collection of entity specific heuristics, each comprising a test to help determine the suitability of data as a value for the corresponding entity. The heuristics processor selects heuristics for the entities to be extracted, and tests observations for these entities against the selected heuristics. Responsive to this testing, ordered possible values for entities to extract are determined.

28 Claims, 4 Drawing Sheets

EXTRACTING INFORMATION FROM FORMATTED SOURCES

PRIORITY CLAIM AND RELATED APPLICATION

This patent application claims the benefit of provisional application Ser. No. 60/656,040, titled "Unique Reverse Attribute VaLue Extraction System (UNRAVL) and Web Information Extraction," filed on Feb. 24, 2005, the entirety of which is hereby incorporated by reference. This patent application is related to co-pending utility application Ser. No. 11/357,289, titled "Reverse Value Attribute Extraction," filed on Feb. 16, 2006, and having the same assignee.

TECHNICAL FIELD

This invention pertains generally to automated information extraction, and more specifically to extracting information from formatted sources, regardless of content or format.

BACKGROUND

With the increasing commercial importance of the Internet, it is becoming more and more important to be able to reliably extract information from any web page. Because the Internet is extremely broad, it contains web pages in a wide variety of domains, and having a wide variety of structures. Information extraction tools should be able to extract information from any web page in which a user may be interested.

Current extraction systems do not allow users to direct the information extraction process. Existing information extraction systems tend to be focused on extracting information from web pages within a given domain. The information is collected using web crawlers or similar technology, for the purpose of allowing a user to later search this extracted information. This is often referred to as vertical search. These systems require extensive training using machine learning techniques to become useful for a given domain, and are unable to process web pages outside of this domain. Thus, these systems do not allow users to extract information from any web page that a user may find interesting.

Other approaches to information extraction focus on techniques that allow information to be extracted from a source with a uniform and known structure (often classed as wrapper generation techniques). These approaches require the structure to be known in advance and fixed. Therefore, although these techniques can be applied to a specific web site with a uniform and known structure, they fail when the structure is either non-uniform or unknown. Thus, such systems are also not capable of extracting information from any web page of interest to a user.

What is needed are methods, systems and computer readable media that allow users to collect, organize and share interesting information they find anywhere on the web, by automatically extracting desired information from any web page. The information should be extracted in a general way, such that it can, e.g., form a summary of that page. The extraction technique should not be restricted to web pages, but should be applicable to any formatted input, regardless of the format.

SUMMARY OF INVENTION

Computer-implemented methods, computer systems and computer-readable media extract information from formatted input. An annotator annotates formatted input with presentation information. A parser then parses the annotated input into a set of elements comprising a canonical representation of the input. An information analyzer analyzes the elements in order to glean additional information. An entity extractor proceeds to determine entities to extract from the input, based on, for example, a classification of the input gleaned from the analysis step. The entity extractor analyzes elements according to specific entities to be extracted, and creates entity specific observations for analyzed elements. These observations comprise possible values for the relevant entities. A heuristics processor maintains a collection of entity specific heuristics, each of which comprises a condition the satisfaction of which provides information on the suitability of tested data as a value for the corresponding entity. The heuristics processor selects heuristics for the entities to be extracted, and tests observations for these entities against the selected heuristics. Responsive to this testing, a plurality of ordered possible values for entities to extract can be determined. This information can be shown to a user for input concerning specific values to select, and the resulting user input can be used to automatically improve existing heuristics using machine learning techniques.

The features and advantages described in this summary and in the following detailed description are not all-inclusive, and particularly, many additional features and advantages will be apparent to one of ordinary skill in the relevant art in view of the drawing, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depicts embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
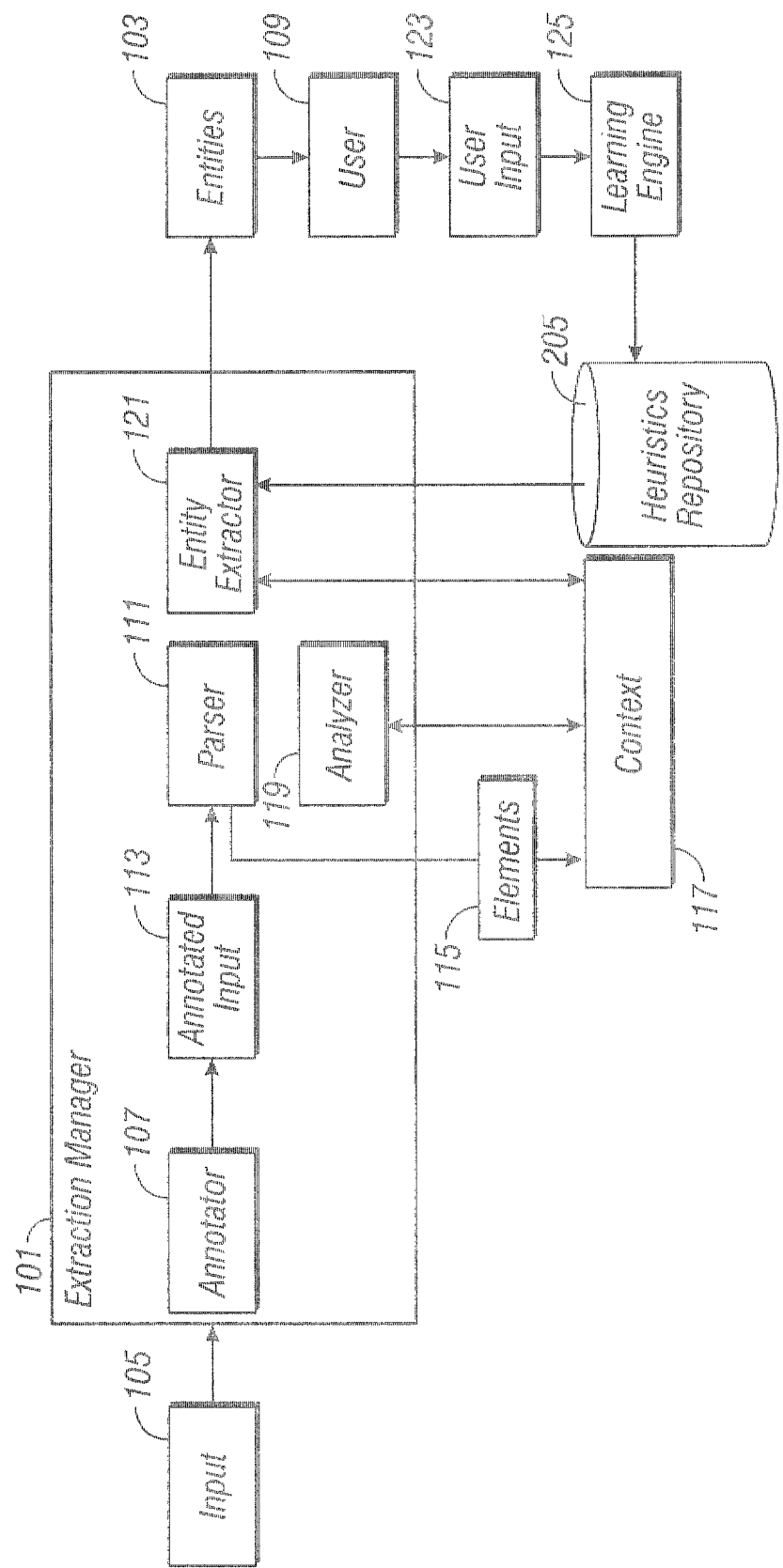
FIG. 1 is a block diagram illustrating a high level overview of an extraction manager extracting information from formatted input, according to some embodiments of the present invention.

FIG. 1 illustrates an extraction manager 101, according to some embodiments of the present invention. It is to be understood that although the extraction manager 101 is illustrated as a single entity, as the term is used herein an extraction manager 101 refers to a collection of functionalities which can be implemented as software, hardware, firmware or any combination of these. Where an extraction manager 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, the extraction manager 101 extracts information entities 103 from formatted input 105. The formatted input 105 often comprises a web page, but can also be in other forms, such as a file in Portable Document Format (PDF), a word processor document, or other types of formatted information.

An annotator 107 annotates the input 105 with presentation and/or layout information, representative of how the input 105 would be presented to a user 109 (e.g., for viewing on a computer monitor). In other words, the input 105 is annotated with information concerning how its creator intends it to be presented to a user 109 (e.g., for a web page, how it would appear when viewed within a browser, for a PDF document, how it would appear when viewed by a PDF document reader, etc.).

In the case of web page annotation, the annotation code 107 can be executed within the user's browser while the user 109 views the page. This can be achieved by using a mechanism that allows application code to run within the browser (e.g., a browser extension, Javascript, Dynamic Hypertext Markup Language, etc.). Similar techniques can be utilized within other types of content viewers.

Alternatively, the input 105 can be rendered independently of the user 109, using a suitable content viewer or a simulator thereof, within which the annotation code 107 executes. This embodiment is useful in a case where the input 105 did not come from a user 109, or where the user 109 is not viewing the input 105.

In either case, the annotation code 107 uses the internal model of the content maintained by the browser or document viewer to visit the nodes of the model, and create annotations such as stylistic information for text (e.g., font size, color and weight); screen position and dimensions of text, images and/or other multi-media objects; and the visibility status of content objects. The annotations can be added to the internal model of the content or converted to a suitable format for further processing (e.g., Hypertext Markup Language (HTML), Extensible Hypertext Markup Language (XHTML), Extensible Markup Language (XML), etc.). The annotations and input 105 can be maintained and processed separately or together as desired.

A parser 111 receives the annotated input 113, and parses it into a canonical form, for example as an array of elements 115. Each element 115 represents a segment of the annotated input 113, such as text, an image, a multi-media object (audio, video or other non-textual objects) or other such object contained within the input. In some embodiments, the array of elements 115 is added to a context 117, which contains shared information about the annotated input 113, and is utilized by subsequent steps of the process as explained below. Of course, the use of an array to hold elements 115, and the use of a context 117 to share information between process steps are variable design choices. Other mechanisms can be utilized to instantiate this functionality, and various implementation alternatives will be readily apparent to those of ordinary skill in the relevant art in light of this specification.

In any case, the parser 111 takes the input and distills it into a canonical representation that is independent of its format type (a web page, a PDF document or a word processor document, for example). This is an important step since it allows later steps to operate independently of the type of the input 105 which was originally received by the extraction manager 101. This canonical representation reflects the salient information from the input 105 that is relevant for analysis and extraction.

Often much of the content within a formatted document is non-substantive markup (specific to the type of document), that is used by a browser or document viewer to render it. The parser 111 removes this irrelevant markup, and creates elements 115 for contiguous units of text (which might be a single word, line of text, sentence or paragraph); images; multi-media objects and other such content. An element 115 can also contain the visual cues as indicated by the annotated input 113 (i.e., as per the annotations added by the annotator 107).

In the case of a web page that consists of HTML (or XHTML) markup, the parser 111 parses the web page and creates elements 115 for the text, images and multi-media objects contained within the markup indicators.

For text, markup symbols that denote text formatting (such as <bold>, <i>, and so on) do not result in elements 115 being created. Instead, text within the markup indicators is aggregated together until a non-formatting symbol is reached (such as <p> or <div>). The goal here is to reduce the input 105 to the smallest number of elements 115, each representing a contiguous section of text within the input 105.

Figure 2:
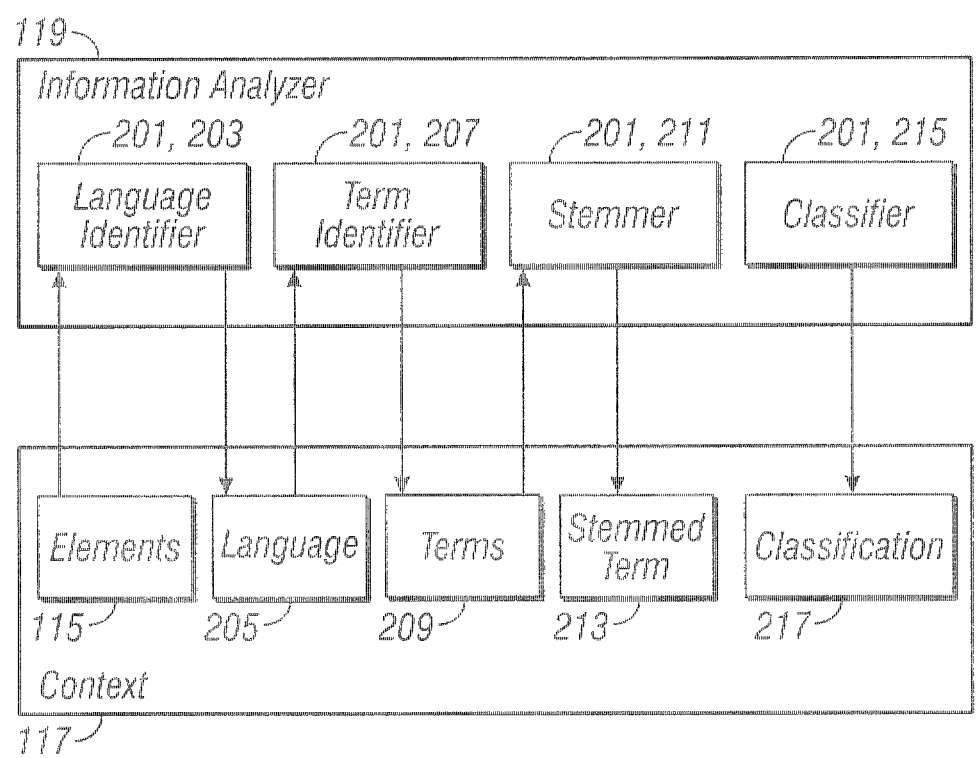
FIG. 2 is a block diagram illustrating the operation of an information analyzer, according to some embodiments of the present invention.

The context 117 is analyzed by an information analyzer 119, which adds additional information about the input 105. Turning now to FIG. 2, the information analyzer 119 is illustrated in greater detail according to one embodiment of the present invention. The information analyzer 119 comprises one or more analysis components 201, which are typically executed in a pre-defined order. Each analysis component 201 analyzes the information already within the context 117, in order to either extend it and/or add new information. The purpose of an analysis component 201 is to add contextual information about the input 105 to the context 117. As an example, a language identifier 203 (a specific example of an analysis component 201) can identify the language 205 in which the input 105 is composed, and add this to the context 117, so that other analysis components 201 further down the workflow can use this information in their analysis of the input 105 (that is to say, by knowing the language 205 in which the input is written, other analysis components 201 can then further analyze it in ways it otherwise could not).

As illustrated in FIG. 2, the information analyzer 119 can consist of multiple analysis components 201 that extend and add to the known information about the input 105. In one embodiment, one analysis component 201 can utilize the output of a previous component 201, such that the plurality of components 201 form a workflow that defines their order of execution.

As noted above, an analysis component 201 can create new information about the input (e.g., in the case of the language identifier 203 described above, an identification of the language 205 of the input 105), or extend existing information about the input 105. For example, a term identifier 207 can create an array of terms 209 for the text in each element 115, and a stemmer 211 can convert each such term 209 to its root linguistic form (stem) 213. Another example of an analysis component is a classifier 215, which creates a content or subject classification 217 for the input 105. It is to be understood that the analysis components 201 illustrated in FIG. 2 are non-exhaustive examples. Other types of analysis can be performed to add information to the context 117 or extend information therein, and other examples of analysis components 201 will be readily apparent to those of ordinary skill in the relevant art in light of this specification.

Figure 3:
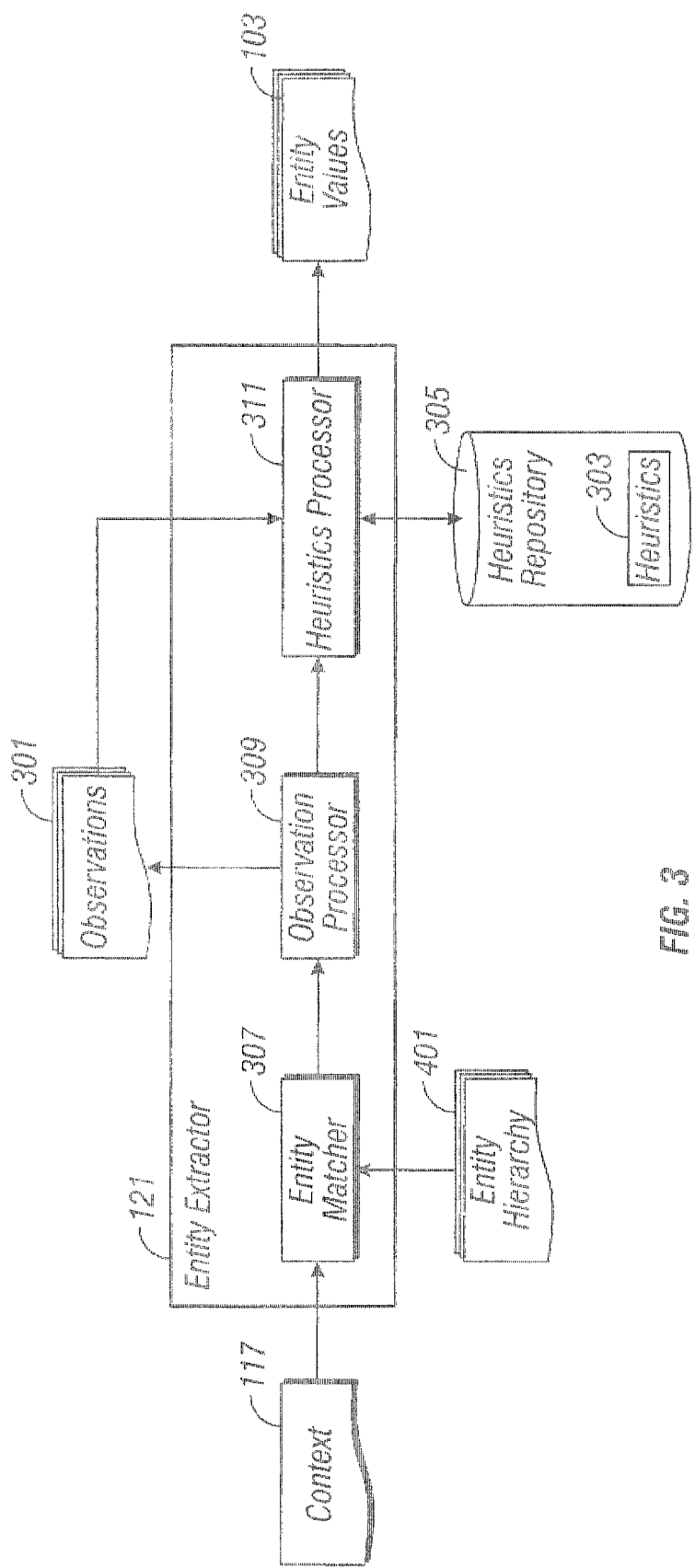
FIG. 3 is a block diagram illustrating the operation of an entity extractor, according to some embodiments of the present invention.

Returning to FIG. 1, after the analysis is complete, information entities 103 are extracted from the input 105 by an entity extractor 121. The operation of the entity extractor 121 is illustrated in greater detail in FIG. 3. As FIG. 3 illustrates, the entity extractor 121 processes each element 115, using the information within the context 117 to create observations 301. An observation 301 represents a possible value for a specific entity 103 to be extracted. A given element 115 can result in zero or more observations 301 being created for an entity 103. The observations 301 are then processed according to one or more relevant heuristics 303, based on the information in the context 117 concerning the input 105. Each heuristic 303 returns a real value based on how well the observation 301 satisfies the heuristic 303. In some embodiments, the values for each observation 301 are aggregated and used to order a set of observations 301 for a given entity 103. The ordered set of observations 301 for each entity 103 can then be presented to a user 109, who is able to select the correct value.

Figure 4:
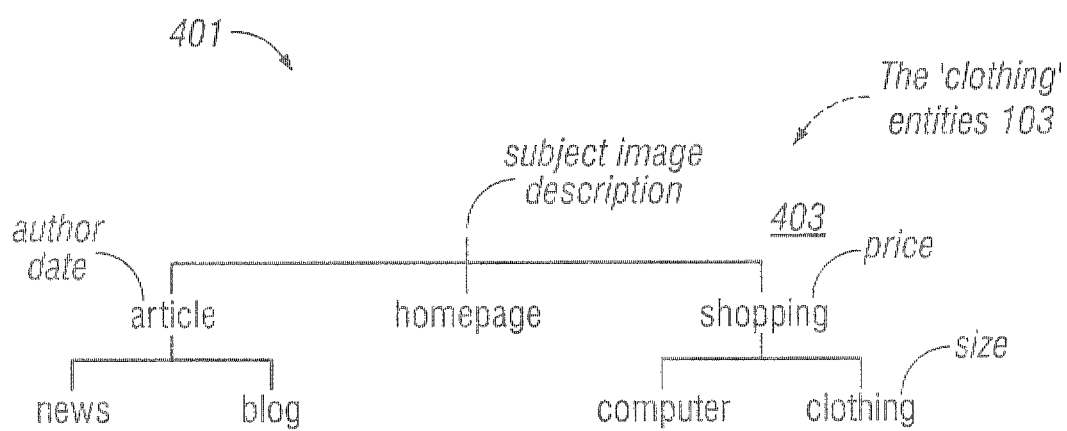
FIG. 4 is a graph illustrating an example of an entity hierarchy, according to some embodiments of the present invention.

Going into greater detail, an entity matcher 307 determines the set of entities 103 that should be extracted, based on the input 105. In some embodiments, entities 103 are organized into a classification hierarchy 401 as depicted in FIG. 4 (which illustrates just one example of such a hierarchy 401). If the classification 217 of the input 105 is known, and if that classification 217 is found in the hierarchy 401, then the entities 103 within the classification's path 403 in the hierarchy 401 comprise the set of entities 103 that will be extracted. In FIG. 4, the path 403 of an example clothing classification 217 (i.e., the input 105 is a web page or other document concerning clothing) is represented by the shaded area. In other words, if the classification 217 of the input 105 is known, then the set of entities 103 to extract therefrom is also known, provided that an extraction set has been defined for the category 217. A classification hierarchy 401 is of course only one possible structure for tracking various classifications 217 and their associated entities 103 to be extracted. Other structures and formats that can be used for this purpose will be readily apparent to those of ordinary skill in the relevant art in light of this specification.

In cases where the classification 217 of the input 105 is unknown, or not found in the hierarchy 401 (i.e., no extraction set has been defined for the classification), then typically all entities 103 will be extracted from the input 105.

An observation processor 309 typically passes each element 115 to each entity 103, which returns zero or more observations 301. The creation of observations 301 is specific to the entity 103 value's type. For example, an entity 103 whose value is an image only creates observations 301 from elements 115 that represent images. Observations 301 can be created for an entire element 115, or for only a specific portion thereof.

A heuristics processor 311 selects a set of heuristics 303 for each entity 103, based on the information concerning the input 105 in the context 117. This information can include (but is not limited to) the language 205 of the input 105, the source of the input 105 (a website, for example) and the classification 217 of the input 105.

A heuristic 303 represents a simple rule that, if satisfied, indicates a likelihood that an observation 301 may (or may not) be a suitable value for an entity 103. Each heuristic 303 typically acts independently of any other, and it is the combination of the results of all the heuristics 303 for an observation 301 that determines the probability of that observation 301 being the actual value for an entity 103. A heuristic 303.can be as simple as:

"Is the text bold?"

Or can be more sophisticated, such as:

"What is the distance of an image's dimensions from the golden ratio (5/3)?"

The heuristics processor 311 checks an observation 301 against a heuristic 303, and returns a real value, which denotes how well the observation 301 satisfies the heuristic's 303 rule. A heuristic 303 can also have zero or more arguments used to control the outcome of the heuristic 303.

A heuristics repository 305 (or other mechanism, e.g., database or ordered list) maintains the specification for each heuristic 303. In some embodiments, a heuristic 303 has a default specification that denotes its relative importance compared to the other heuristics 303 for the same entity 103. Heuristics 303 can also include default values of their arguments (if any). The relative importance and/or argument values can be specialized on one or more dimensions. Examples of such dimensions include (but are not limited to) classification 217 and input 105 source. These dimensions allow the extraction manager 101 to learn and improve the accuracy of the extraction within a given scope. The specification for a heuristic 303 can thus be the combination of the heuristic's specifications across the various dimensions found within the context 117.

A set of heuristics 303 is typically pre-defined within the system, but additional heuristics 303 can be added thereafter, and existing heuristics 303 can be edited and refined.

The heuristics processor 311 typically passes each observation 301 to each relevant heuristic 303 and records the returned value. In some embodiments, the heuristics processor 311 aggregates these values for each observation 301. After every observation 301 has been passed to each relevant heuristic 303, the observations 301 for a given entity 103 can be ordered based on their aggregate values. The ordered values can be returned to a user 109, who can select appropriate values to extract for specific entities 103. In other embodiments, some or all of the extraction is performed without user 109 input, based on the automatically generated ordered values.

Returning our attention now to FIG. 1, in embodiments of the invention in which the user 109 provides input 123 in the extraction process, the user's input 123 is passed to a learning engine 125. The learning engine 125 compares the automatically extracted values for each entity 103 to the user's 109 selected values 123, and then utilizes machine learning techniques to fine tune the relevant heuristics 303 in the heuristics repository 305. In this way, the extraction manager 101 improves the accuracy of its extraction over time, based on input 123 from users 109.

More specifically, the learning engine 125 can use machine learning in two areas: the first is determining the relative importance of a heuristic 303 for a given entity 103; the second is determining the appropriate values for a heuristic's 303 arguments, such that the heuristic 303 returns the highest possible value for an observation 301 that represents the actual value for an entity 103.

An example of one such learning approach to determine the relative importance of a heuristic 303 is to first create a set of those heuristics 303 (with values) that returned a non-zero value for observations 301 whose aggregate values are greater than the aggregate value of the observation 301 that matches the user's 109 choice. Next, a set of heuristics 303 (and values) is created for the observation 301 that matches the user's 109 choice. This results in two sets, one of heuristics 303 for the incorrect observations 301 and the second of heuristics 303 for the correct observation 301.

The next step is to identify the heuristics 303 that are unique to each set. The relative importance of the unique heuristics 303 in the first set are reduced, and those in the second set are increased. After this, the relative importance for the heuristic 303 whose value in the second set is the maximum of all the values for the heuristics 303 in both sets is increased.

After each change in the relative importance, the aggregate values for all observations 301 are recalculated and if the observation 301 that matches the user's 109 chosen value is greater than its previous value, then the change is kept, otherwise it is discarded. If the observation's 301 aggregate value is greater than that of all other observations 301, then the learning terminates, otherwise it continues until either all heuristics 303 have been adjusted or the observation 301 that matches the user's 109 choice has the highest value.

The relative importance of a heuristic 303 can be changed by associating a coefficient with each heuristic 303 (a real value), which is then used as a multiplier by the heuristic 303 to calculate the value that should be returned for an observation 301. This coefficient can be increased or decreased as a result of machine learning. The value is changed in small increments (+/−0.25 for example) based on each user's 109 actions. To avoid increasing the importance of a given heuristic 303 disproportionately to all others, there can be a pre-determined upper and lower bound for the coefficient (+/−2.0, as an example).

To avoid an anomalous page or erroneous user input 123 from skewing the learning algorithm, a trend for the coefficient can also be maintained. This is done by calculating the coefficient's variance over time. Only when the variance is below a given pre-defined threshold will the coefficient be used by the entity extractor 121.

Of course, these are only specific examples of using user input 122 to adjust heuristics 303 to improve searching. Other examples will be readily apparent to those of ordinary skill in the relevant art in light of this specification.

The extraction manager 101 can use user input 122 to specialize the extraction based on the classification 217 and source of the input 105 (a source might be a website, a repository of academic articles or other collection of similarly formatted documents). In this way, the extraction manager 101 uses the activity of its users 109 to improve the extraction for subsequent users 109.

In summary, the extraction manager 101 can extract information from formatted input 105 (e.g., documents that contain presentational information such as web pages, PDF documents and word processor documents) using the formatting cues along with the unstructured text contained within the document. The present invention can be used by itself or in conjunction with the invention of the "Reverse Value Attribute Extraction" patent application to enable users 109 to collect, organize and share interesting information they find in any formatted source, including any web page. The extracted information can, for example, form a summary of input source.

In light of the present description, computer-readable media are understood to constitute data storage elements such as computer memory and mass storage devices. Computer memory may constitute any type of memory suitable for recording computer program code therein, including at least: read-only memory (ROM), volatile memory, such as random-access memory (RAM) and buffer memory. Mass storage devices may constitute any type of fixed storage device, such as a disk drive, and removable storage devices such as compact discs (CD's). Computer-readable media also are understood to constitute any type of data storage element or data container known now or in the future to persons of ordinary skill in the relevant arts.

As will be understood by those familiar with the art, the invention may be embodied in other specific forms without departing from the spirit or essential characteristics thereof. Likewise, the particular naming and division of the modules, agents, managers, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, agents, managers, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for extracting information from formatted input, the method comprising the steps of:

annotating, by a computer, formatted input with presentation information;

parsing, by a computer, annotated data into a plurality of elements comprising a canonical representation of the formatted input, independent of the input format, wherein said canonical representation comprises a sequence of elements, each element representing a segment of the formatted input;

analyzing, by a computer, at least some of the sequence of elements of the plurality in order to glean additional information concerning the input context, said input context comprising information about the formatted input that is shared between process steps;

determining, by a computer, at least one entity to extract from the input;

for each entity to extract, creating, by a computer, at least one observation concerning at least one element of the sequence of the elements of the plurality in context of the entity, each observation indicating possible information concerning the entity;

testing, by a computer, at least one observation against relevant heuristics by maintaining, by a computer, a plurality of entity specific heuristics, each heuristic comprising a condition the satisfaction of which provides information on the suitability of tested data as a value for the corresponding entity, wherein at least some of the entity specific heuristics are associated with a weight to uses in determining, by a computer, the probability of an observation tested according to the heuristic comprising the value for the entity;

selecting, by a computer, at least one heuristic from the plurality for each entity to extract;

testing at least one observation for at least one entity against the at least one heuristic selected for that entity; and responsive to the testing step, determining a probability of the at least one tested observation comprising the value for the entity; and determining, by a computer, at least one possible value for at least one entity to extract, based on testing the at least one observation against relevant heuristics.

2. The method of claim 1, wherein the step of analyzing by a computer, at least some of the elements of the plurality in order to glean additional information concerning the input further comprises: performing, by a computer, a series of analysis steps in order, such that output from an earlier step is used as input to a later step.

3. The method of claim 1, wherein the step of determining, by a computer, at least one entity to extract from the input further comprises: determining, by a computer, at least one entity to extract based on a classification of the input gleaned from the analysis step.

4. The method of claim 1, wherein the step of determining, by a computer, at least one entity to extract from the input further comprises: determining, by a computer, a default set of entities to extract responsive to not having gleaned a classification of the input from the analysis step.

5. The method of claim 1, wherein the step of determining, by a computer, at least one entity to extract from the input further comprises: utilizing, by a computer, a classification of the input gleaned from the analysis step and an entity classification hierarchy to determine a set of entities to extract from the input.

6. The method of claim 1, wherein the step of creating, by a computer, at least one observation concerning at least one element of the plurality in context of an entity further comprises: analyzing, by a computer, at least some elements of the plurality within a specific context of at least one entity, and creating entity specific observations for analyzed elements, the observations comprising possible values for the associated entity.

7. The method of claim 1, further comprising: providing, by a computer, at least one determined possible value for at least one entity to a user.

8. The method of claim 7, wherein the step of providing, by a computer, at least one determined possible value for at least one entity to a user further comprises:

providing, by a computer, at least one determined plurality of ordered possible values for at least one entity to the user.

9. The method of claim 7, further comprising: responsive to providing, by a computer, the at least one possible value for the at least one entity to the user, receiving, by a computer, input from the user concerning the value to use for at least one entity.

10. The method of claim 9, further comprising: using the input received from the user to automatically improve, by a computer, at least one heuristic.

11. The method of claim 10, wherein automatically, by a computer, improving a heuristic further comprises performing, by a computer, at least one step from a group of steps consisting of:

using machine learning to determine the relative importance of the heuristic based on input received from the user; and based on input received from the user, using machine learning to determine at least one more appropriate value for at least one argument of the heuristic so that the heuristic returns more accurate results.

12. A computer readable storage medium for extracting information from formatted input, the computer readable storage medium storing computer program product comprising program code for:

annotating formatted input with presentation information;

parsing annotated data into a plurality of elements comprising a canonical representation of the formatted input, independent of the input format, wherein said canonical representation comprises a sequence of elements, each element representing a segment of the annotated formatted input;

analyzing at least some of the sequence of elements of the plurality in order to glean additional information concerning the input context, said context comprising information about said the formatted input that is shared between process steps;

determining at least one entity to extract from the formatted input; for each entity to extract, creating at least one observation concerning at least one element of the sequence of the element of the plurality in context of the entity, each observation indicating possible information concerning the entity;

testing at least one observation against relevant heuristic by maintaining, by a computer, a plurality of entity specific heuristics, each heuristic comprising a condition the satisfaction of which provides information on the suitability of tested data as a value for the corresponding entity, wherein at least some of the entity specific heuristics are associated with a weight to uses in determining, by a computer, the probability of an observation tested according to the heuristic comprising the value for the entity;

selecting, by a computer, at least one heuristic from the plurality for each entity to extract;

testing at least one observation for at least one entity against the at least one heuristic selected for that entity; and responsive to the testing step, determining a probability of the at least one tested observation comprising the value for the entity; and determining at least one possible value for at least one entity to extract, based on testing the at least one observation against relevant heuristics.

13. The computer readable storage medium of claim 12, wherein the program code for determining at least one entity to extract from the input further comprises: program code for determining at least one entity to extract based on a classification of the input gleaned from the analysis step.

14. The computer readable storage medium of claim 12, wherein the program code for determining at least one entity to extract from the input further comprises: program code for utilizing a classification of the input gleaned from the analysis step and an entity classification hierarchy to determine a set of entities to extract from the input.

15. The computer readable storage medium of claim 12, wherein the program code for creating at least one observation concerning at least one element of the plurality in context of an entity further comprises: program code for analyzing at least some elements of the plurality within a specific context of at least one entity, and creating entity specific observations for analyzed elements, the observations comprising possible values for the associated entity.

16. The computer readable storage medium of claim 12, program code for providing at least one determined possible value for at least one entity to a user.

17. The computer readable storage medium of claim 16, wherein the program code for providing at least one determined possible value for at least one entity to a user further comprises: program code for providing at least one determined plurality of ordered possible values for at least one entity to the user.

18. The computer readable storage medium of claim 16, further storing comprising: program code for, responsive to providing the at least one possible value for the at least one entity to the user, receiving input from the user concerning the value to use for at least one entity.

19. The computer readable storage medium of claim 18, further storing program code for using the input received from the user to automatically improve at least one heuristic.

20. A computer system for extracting information from formatted input, the computer system comprising a physical computer system with a processor and a memory, said physical computer system being programmed to execute the following steps:

annotating formatted input with presentation information;

parsing annotated data into a plurality of elements comprising a canonical representation of the formatted input, independent of the input format, wherein said canonical representation comprises a sequence of elements, each element representing a segment of the annotated formatted input;

analyzing at least some of the sequence of elements of the plurality in order to glean additional information concerning the input context, said context comprising information about the formatted input that is shared between process steps;

determining at least one entity to extract from the formatted input;

for each entity to extract, creating at least one observation concerning at least one element of the sequence of the elements of the plurality in context of the entity, each observation indicating possible information concerning the entity;

testing at least one observation against relevant heuristics by maintaining, by a computer, a plurality of entity specific heuristics, each heuristic comprising a condition the satisfaction of which provides information on the suitability of tested data as a value for the corresponding entity, wherein at least some of the entity specific heuristics are associated with a weight to uses in determining, by a computer, the probability of an observation tested according to the heuristic comprising the value for the entity;

selecting, by a computer, at least one heuristic from the plurality for each entity to extract;

testing at least one observation for at least one entity against the at least one heuristic selected for that entity; and responsive to the testing step, determining a probability of the at least one tested observation comprising the value for the entity; and determining at least one possible value for at least one entity to extract, based on testing the at least one observation against relevant heuristics.

21. The computer system of claim 20, wherein determining at least one entity to extract from the input further comprises: determining at the least one entity to extract based on a classification of the input gleaned from the analysis step.

22. The computer system of claim 20, wherein determining at least one entity to extract from the input further comprises: utilizing a classification of the input gleaned from the analysis step and an entity classification hierarchy to determine a set of entities to extract from the input.

23. The computer system of claim 20, wherein creating at least one observation concerning at least one element of the plurality in context of an entity further comprises: analyzing at least some elements of the plurality within a specific context of at least one entity, and creating entity specific observations for analyzed elements, the observations comprising possible values for the associated entity.

24. The computer system of claim 20, wherein said computer system is further programmed for: providing at least one determined possible value for at least one entity to a user.

25. The computer system of claim 24, wherein providing at least one determined possible value for at least one entity to a user further comprises: providing at least one determined plurality of ordered possible values for at least one entity to the user.

26. The computer system of claim 24, further comprising:
responsive to providing the at least one possible value for the at least one entity to the user, receiving input from the user concerning the value to use for at least one entity.

27. The computer system of claim 26, wherein said computer system is further programmed for: using the input received from the user to automatically improve at least one heuristic.

28. A computer system for extracting information from formatted input, the computer system comprising:

a processor;

a memory;

hardware means for annotating formatted input with presentation information;

hardware means for parsing annotated data into a plurality of elements comprising a canonical representation of the formatted input, independent of the input format, wherein said canonical representation comprises a sequence of elements, each element representing a segment of the formatted input;

hardware means for analyzing at least some of the sequence of elements of the plurality in order to glean additional information concerning the input context, said input context comprising information about the formatted input that is shared between process steps;

hardware means for determining at least one entity to extract from the input;

hardware means for creating, for each entity to extract, at least one observation concerning at least one element of the sequence of the elements of the plurality in context of that entity, each observation indicating possible information concerning the entity;

hardware means for testing at least one observation against relevant heuristics by maintaining, by a computer, a plurality of entity specific heuristics, each heuristic comprising a condition the satisfaction of which provides information on the suitability of tested data as a value for the corresponding entity, wherein at least some of the entity specific heuristics are associated with a weight to uses in determining, by a computer, the probability of an observation tested according to the heuristic comprising the value for the entity;

selecting, by a computer, at least one heuristic from the plurality for each entity to extract;

testing at least one observation for at least one entity against the at least one heuristic selected for that entity; and responsive to the testing step, determining a probability of the at least one tested observation comprising the value for the entity; and hardware means for determining at least one possible value for at least one entity to extract, based on testing the at least one observation against relevant heuristics.

* * * * *

UNITED STATES PATENT AND TRADEMARK OFFICE
CERTIFICATE OF CORRECTION

PATENT NO. : 7,630,968 B2 Page 1 of 1
APPLICATION NO. : 11/357656
DATED : December 8, 2009
INVENTOR(S) : Keiron McCammon and Manish Chandra It is certified that error appears in the above-identified patent and that said Letters Patent is hereby corrected as shown below:

In Claim 12, Column 10, lines 15-16, replace "about said the formatted input that is shared between process steps;"

with "about the formatted input that is shared between process steps;"

Signed and Sealed this

Ninth Day of February, 2010

David J. Kappos
*Director of the United States Patent and Trademark Office*